US008679596B2

(12) United States Patent
Ito et al.

(10) Patent No.: US 8,679,596 B2
(45) Date of Patent: Mar. 25, 2014

(54) LIQUID CRYSTAL DISPLAY DEVICE

(71) Applicant: Japan Display East Inc., Mobara (JP)

(72) Inventors: Masato Ito, Mobara (JP); Masato Sakurai, Ichikawa (JP); Takeshi Sato, Kokubunji (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 13/765,826

(22) Filed: Feb. 13, 2013

(65) Prior Publication Data

US 2013/0215367 A1    Aug. 22, 2013

(30) Foreign Application Priority Data

Feb. 16, 2012    (JP) .................................. 2012-031353

(51) Int. Cl.
*G02F 1/1337*    (2006.01)

(52) U.S. Cl.
USPC .......................... 428/1.26; 428/1.25; 349/123

(58) Field of Classification Search
USPC .......................... 428/1.25–1.26; 349/123–135
See application file for complete search history.

(56) References Cited

U.S. PATENT DOCUMENTS

| 2010/0066961 | A1* | 3/2010 | Matsui et al. | 349/129 |
| 2011/0199565 | A1* | 8/2011 | Kunimatsu et al. | 349/123 |
| 2012/0300157 | A1* | 11/2012 | Kim et al. | 349/106 |

FOREIGN PATENT DOCUMENTS

JP    2011-85613    4/2011

* cited by examiner

*Primary Examiner* — Sophie Hon
(74) *Attorney, Agent, or Firm* — Antonelli, Terry, Stout & Kraus, LLP.

(57) ABSTRACT

The present invention provides a liquid crystal display device including a first substrate and a second substrate that are arranged to face each other while sandwiching liquid crystal, wherein: a first electrode and plural second electrodes are formed at a pixel area on the first substrate on the liquid crystal side; an alignment layer is provided which includes a first alignment layer formed on the first substrate on the liquid crystal side to cover the second electrodes and a second alignment layer formed on the first alignment layer on the liquid crystal side; the resistance of the second alignment layer is lower than that of the first alignment layer; and the transmittance of the second alignment layer is lower than that of the first alignment layer.

5 Claims, 7 Drawing Sheets

LIQUID CRYSTAL DISPLAY DEVICE

CLAIM OF PRIORITY

The present application claims priority from Japanese Patent Application JP2012-031353 filed on Feb. 16, 2012, the content of which is hereby incorporated by reference into this Application.

BACKGROUND OF THE INVENTION

1. Field of the Invention

The present invention relates to a liquid crystal display device, and particularly to an In-Plane Switching mode liquid crystal display device (abbreviated as IPS mode LCD).

2. Description of the Related Art

The IPS mode LCD can be configured to be excellent in wide viewing angle characteristics while molecules of liquid crystal are driven to rotate in a plane in parallel with the surfaces of a pair of substrates sandwiching the liquid crystal.

FIG. 8 is a cross-sectional view of a pixel for showing an example of such a liquid crystal display device. Of a first substrate SUB1 and a second substrate SUB2 that are arranged to face each other while sandwiching liquid crystal LC, a pixel electrode PX and an opposite electrode CT are arranged through an insulating film IN on the face of the first substrate SUB1 on the liquid crystal LC-side. The opposite electrode CT is formed as a plane-like pattern, for example, under the insulating film IN, and the pixel electrode PX is formed as a pattern of plural lines that are provided in parallel on the insulating film IN. It should be noted that a first alignment layer ORI1 to determine the initial alignment direction of molecules of the liquid crystal LC is formed on the pixel electrode PX. An electric field is generated between the pixel electrode PX and the opposite electrode CT to drive the molecules of the liquid crystal LC.

In terms of configurations other than those described in FIG. 8, refer to descriptions of an embodiment of the present invention in FIG. 2.

As a device related to the invention of the present application, there is a liquid crystal display device disclosed in, for example, Japanese Patent Application Laid-Open No. 2011-085613. Japanese Patent Application Laid-Open No. 2011-085613 discloses a structure with two alignment layers.

SUMMARY OF THE INVENTION

In the liquid crystal display device shown in FIG. 8, an equivalent circuit shown in FIG. 9 is formed near the first alignment layer ORI1 by capacitances and resistances of the first alignment layer ORI1. The equivalent circuit of FIG. 9 can be recognized as a circuit in which, for example, along the line of electric force (shown by an arrow EF in FIG. 8) of an electric field ranging from the pixel electrode PX to the opposite electrode CT, an interfacial resistance R1 between the pixel electrode PX and the first alignment layer ORI1, a parallel-connection part of a capacitance C4 and a resistance R4 of the first alignment layer ORI1, a parallel-connection part of a resistance R2 of the first alignment layer ORI1 and a capacitance C2 of the liquid crystal LC, a parallel-connection part of a capacitance C4 and a resistance R4 of the first alignment layer ORI1, and a capacitance C3 of the insulating film IN are connected in series.

Therefore, DC current I flows in the first alignment layer ORI1 to accumulate electrical charge (residual DC) in the insulating film IN. In addition, the accumulation of such residual DC in the insulating film IN causes so-called baking or flicker.

In this case, an increase in resistance of the first alignment layer ORI1 can prevent the DC current from being generated. However, in the case where the DC current is generated in the insulating film IN, it becomes disadvantageously difficult to draw out the residual DC and to eliminate the baking.

Further, if the structure with two alignment layers disclosed in Japanese Patent Application Laid-Open No. 2011-085613 is employed, the baking can be reduced. However, there is a concern that the display performance is deteriorated due to current (photoconductor current) generated by the first alignment layer ORI1 absorbing light.

The present invention has been achieved in view of the above-described problems, and an object thereof is to provide a liquid crystal display device in which baking is reduced to improve the display performance without deteriorating the levelness of the face on the liquid crystal side and while suppressing an impact of photoconductor current.

Although the present invention can be recognized from plural viewpoints, a liquid crystal display device according to a representative aspect of the present invention from one viewpoint will be described below. Further, a liquid crystal display device of the present invention from other viewpoints will become apparent from the following descriptions of a mode for carrying out the present invention.

In order to solve the problems, the present invention provides:

a liquid crystal display device comprising a first substrate and a second substrate that are arranged to face each other while sandwiching liquid crystal, wherein a first electrode and a plurality of second electrodes overlapped with the first electrode through an insulating film are formed at a pixel area on the liquid crystal side of the first substrate, one of the first electrode and the second electrodes is used as a pixel electrode, and the other is used as an opposite electrode;

an alignment layer is provided which includes a first alignment layer formed on the liquid crystal side of the first substrate to cover the second electrodes and a second alignment layer formed on the liquid crystal side of the first alignment layer;

the resistance of the second alignment layer is lower than that of the first alignment layer, and the transmittance of the second alignment layer is lower than that of the first alignment layer; and at least the second alignment layer is configured using a compound obtained by polymerizing PMDA (pyromellitic acid dianhydride) serving as a first compound with a hydrocarbon organic material.

According to the present invention, baking can be reduced to improve the display performance without deteriorating the levelness of the face on the liquid crystal side and while suppressing an impact of photoconductor current.

The other effects of the present invention will become apparent from the descriptions of the entire specification.

DETAILED DESCRIPTION OF THE INVENTION

Figure 1:
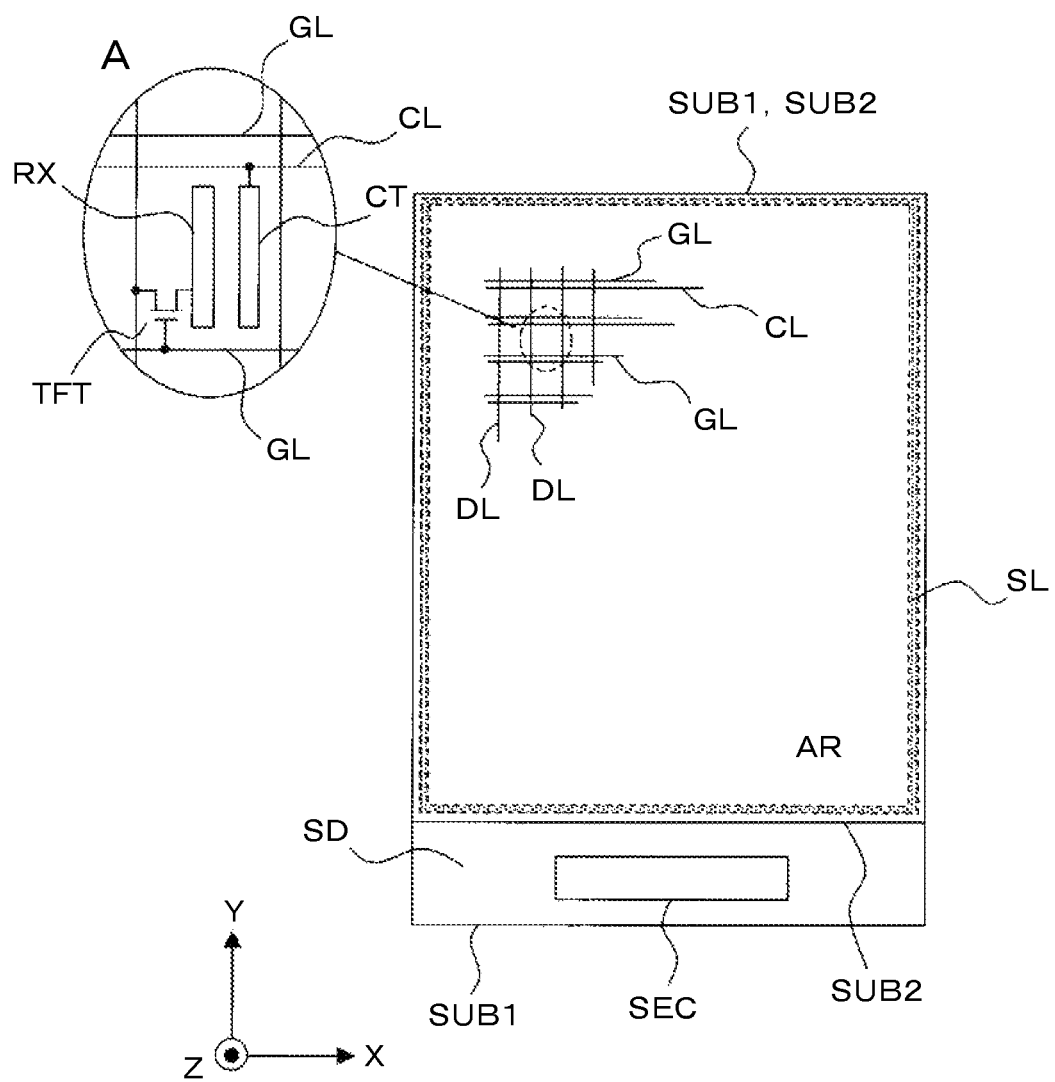
FIG. 1 is a plan view for showing an outline of a liquid crystal display device according to a first embodiment of the present invention.

Hereinafter, an embodiment of the present invention will be described using the drawings. The following description shows an embodiment of the present invention. The present invention is not limited to the embodiment, but can be variously changed and modified by those skilled in the art within a range of technical ideas disclosed in the specification. Further, constitutional elements having the same functions are given the same reference numerals throughout the all drawings for explaining the embodiment and concrete examples, and the explanations thereof will not be repeated in some cases.

Furthermore, X, Y, and Z shown in the drawings denote an X-axis, a Y-axis, and a Z-axis, respectively.

[First Embodiment]
<Entire Configuration>

FIG. 1 is a plan view for showing an outline of a liquid crystal display device according to a first embodiment of the present invention. In FIG. 1, there are provided a first substrate SUB1 and a second substrate SUB2 that are arranged to face each other while sandwiching liquid crystal (not shown). The second substrate SUB2 is arranged on the observer side. On the back face of the first substrate SUB1, a backlight (not shown) is arranged. The area of the second substrate SUB2 is slightly smaller than that of the first substrate SUB1, and a side SD of the first substrate SUB1 located on the lower side of the drawing is exposed. On the side SD of the first substrate SUB1 located on the lower side of the drawing, a semiconductor device (semiconductor chip) SEC is mounted. The semiconductor device SEC has a control circuit to drive each pixel in a display area AR (to be described later). A seal member SL is formed on the periphery of the second substrate SUB2 to be fixed and attached to the first substrate SUB1, and also functions to seal the liquid crystal.

An area surrounded by the seal member SL serves as a display area AR. On the surface of the display area AR of the first substrate SUB1 on the liquid crystal side, there are formed gate signal lines GL that extend in the X direction of the drawing and are provided in parallel in the Y direction and drain signal lines DL that extend in the Y direction of the drawing and are provided in parallel in the X direction. An area surrounded by a pair of adjacent gate signal lines GL and a pair of adjacent drain signal lines DL serves as a pixel area. Thereby, the display area AR has plural pixels arranged in a matrix pattern.

As illustrated in an enlarged view A that is an equivalent circuit view in the dotted elliptical frame in the drawing, a thin-film transistor TFT that is turned on by a signal (scanning signal) from the gate signal lines GL, a pixel electrode PX to which a signal (video signal) is supplied from the drain signal lines DL through the thin-film transistor TFT, and an opposite electrode CT that generates an electric field between the opposite electrode CT and the pixel electrode PX are formed in each pixel area. The electric field has components in parallel with the surface of the first substrate SUB1, and the alignment state of molecules of the liquid crystal is changed while the molecules remain horizontal to the surface of the first substrate SUB1. The liquid crystal display device of this kind is referred to as an In-Plane Switching mode liquid crystal display device (abbreviated as IPS mode LCD). It should be noted that a reference signal relative to a video signal is supplied to each opposite electrode CT through, for example, the common signal lines CL provided in parallel with the gate signal lines GL.

It should be noted that the gate signal lines GL, the drain signal lines DL, and the common signal lines CL are connected to the semiconductor device SEC through leading lines (not shown). Scan signals, video signals, and reference signals are supplied to the gate signal lines GL, the drain signal lines DL, and the common signal lines CL, respectively.

<Configuration of Pixel>

Figure 2:
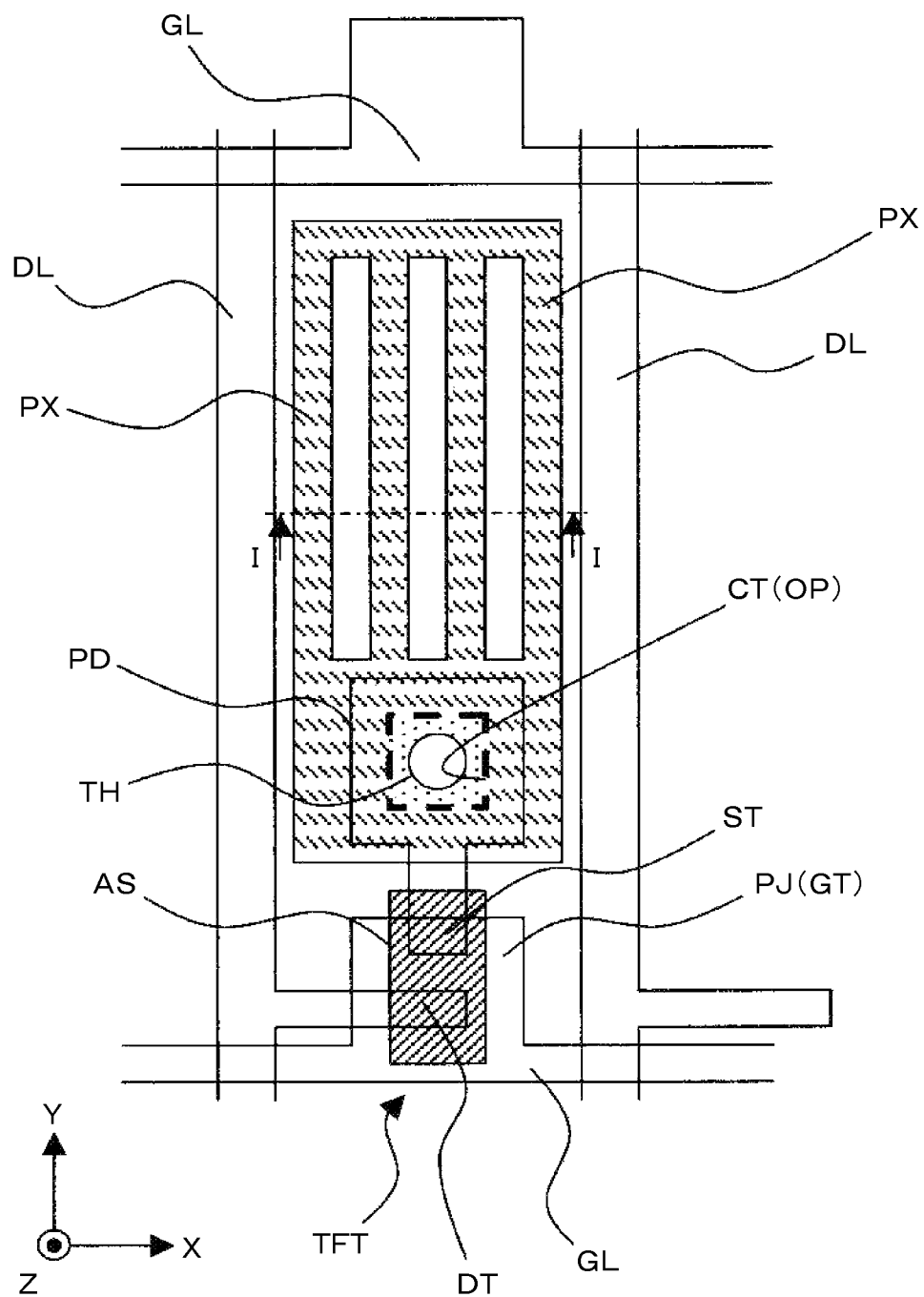
FIG. 2 is a plan view of a pixel formed on a first substrate SUB1 on the liquid crystal side in the liquid crystal display device according to the present invention.
Figure 3:
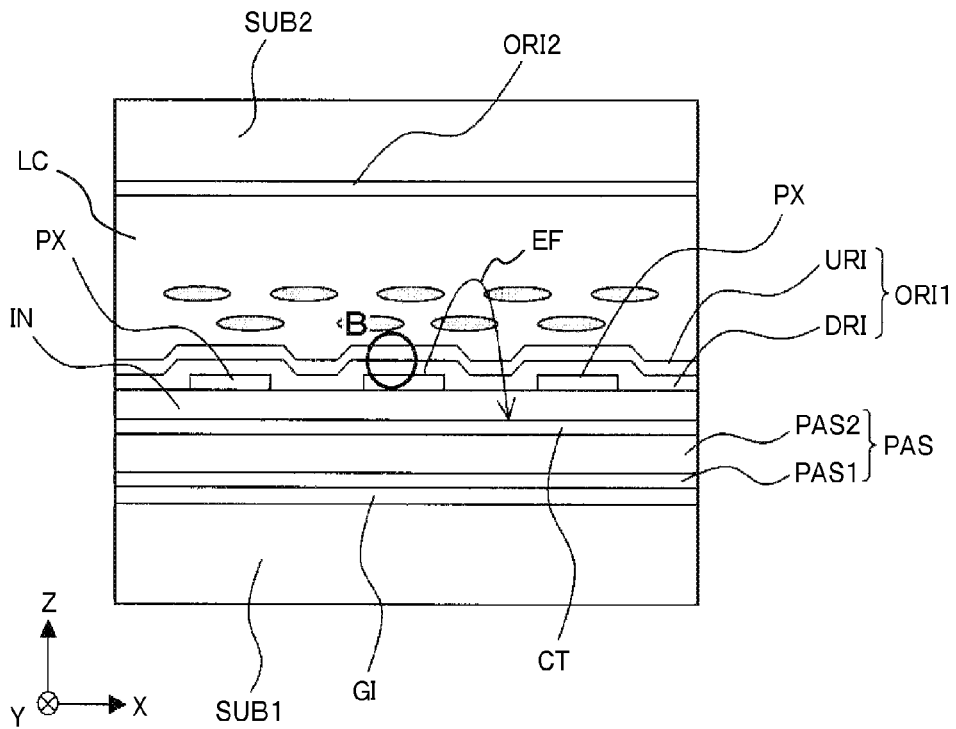
FIG. 3 is a cross-sectional view taken along the line I-I shown in FIG. 2.

FIG. 2 shows a configuration of the pixel shown by the circle A of FIG. 1, and is a plan view of the pixel formed on the first substrate SUB1 on the liquid crystal side. Further, FIG. 3 is a cross-sectional view taken along the line I-I of FIG. 2, and the second substrate SUB2 is also depicted.

In FIG. 2, the gate signal lines GL that extend in the X direction of the drawing and are provided in parallel in the Y direction are formed on the face (surface) of the first substrate SUB1 (see FIG. 3) on the liquid crystal side. The gate signal lines GL define the pixel areas together with the drain signal lines DL (to be described later). A projecting portion PJ projecting on the pixel area side is formed at each gate signal line GL to configure a gate electrode GT of the thin-film transistor TFT (to be described later).

On the surface of the first substrate SUB1, an insulating film GI (see FIG. 3) is formed which covers the gate signal lines GL (gate electrodes GT). The insulating film GI functions as a gate insulating film for the thin-film transistor TFT in the area where the thin-film transistor TFT is formed, and functions as an interlayer insulating film for the gate signal lines GL and the drain signal lines DL at intersection portions between the gate signal lines GL and the drain signal lines DL.

An island-shaped semiconductor layer AS made of, for example, amorphous silicon is formed at at least a portion where the gate electrode GT overlaps the upper face of the insulating film GI. The semiconductor layer AS serves as a semiconductor layer for the thin-film transistor TFT. A drain electrode DT and a source electrode ST are arranged to face each other on the upper face of the semiconductor layer AS, so that the thin-film transistor TFT of a so-called bottom gate MIS (Metal Insulator Semiconductor) type can be configured.

In this case, the drain electrode DT and the source electrode ST are formed at the same time as when, for example, the drain signal lines DL are formed. The drain signal lines DL extend in the Y direction of the drawing and are provided in parallel in the X direction, and the drain electrode DT is formed in such a manner that a part of the drain signal line DL extends over the semiconductor layer AS. The source electrode ST extends up to the outside of the area where the semiconductor layer AS is formed, and is formed integrally with a pad portion PD arranged adjacent to the semiconductor layer AS. The area of the pad portion PD is relatively large, and the pad portion PD functions as a contact portion with a pixel electrode PX (to be described later).

On the surface of the first substrate SUB1, formed is a protective film PAS covering the drain signal lines DL, the thin-film transistor TFT, and the pad portion PD. The protective film PAS stabilizes the characteristics of the thin-film transistor TFT by avoiding a direct contact between the thin-film transistor TFT and the liquid crystal. The protective film PAS is formed in such a manner that, for example, a first protective film PAS1 configured using an inorganic insulating film and a second protective film PAS2 configured using an organic insulating film are sequentially laminated. Using the organic insulating film that can be formed by being coated on the upper layer of the protective film PAS, the surface can be leveled.

On the upper face of the protective film PAS, the opposite electrode CT is formed which is configured using, for example, an ITO (Indium Tin Oxide) translucent conductive film. The opposite electrode CT is entirely formed on the display area AR, and is formed as an electrode in each pixel to which a common signal (reference signal) is supplied. It should be noted that an opening portion OP is formed in the opposite electrode CT so as to be overlapped with the area where the pad portion PD is formed. As described above, the pad portion PD serves as a contact portion with the pixel electrode PX. Thus, the opening portion OP prevents a short circuit between the pixel electrode PX and the opposite electrode CT at the contact portion. The opposite electrode CT formed in such a manner is formed in a plane-like pattern in each pixel.

On the surface of the first substrate SUB1, an insulating film IN is formed which covers the opposite electrode CT. The insulating film IN functions as an interlayer insulating film between the opposite electrode CT and the pixel electrode PX (to be described later).

On the insulating film IN in the pixel area, the pixel electrode PX is formed which is configured using, for example, an ITO (Indium Tin Oxide) translucent conductive film. The pixel electrode PX is formed using linearly-patterned electrodes (for example, four) that extend in the Y direction of the drawing and are provided in parallel in the X direction. The electrodes of the pixel electrode PX are formed as a pattern in which ends of the electrodes are connected to each other. In addition, the end of the pixel electrode PX on the thin-film transistor TFT-side covers the area where the pad portion PD is formed to be connected to the pad portion PD through a through-hole TH formed in the insulating film IN and the protective film PAS. Accordingly, the pixel electrode PX is electrically connected to the source electrode ST of the thin-film transistor TFT. It should be noted that the through-hole TH is formed in the opening portion OP of the opposite electrode CT, so that the opposite electrode CT is not exposed to the side wall of the through-hole TH.

On the surface of the first substrate SUB1, an alignment layer ORI1 is formed which covers the pixel electrode PX. In the case of the first embodiment, the alignment layer ORI1 is formed as a two-layer structure of, for example, an upper alignment layer (second alignment layer) URI arranged on the liquid crystal layer side and a lower alignment layer (first alignment layer) DRI arranged on the first substrate side (or the pixel electrode PX-side). In addition, the lower alignment layer DRI on the pixel electrode PX-side is made of a material higher in resistance than that of the upper alignment layer URI on the liquid crystal LC-side in the alignment layer ORI1. For example, the resistance (resistivity) of the upper alignment layer URI is $10^{14}$ ($\Omega \cdot$cm) or lower, whereas the resistance (resistivity) of the lower alignment layer DRI is $10^{14}$ ($\Omega \cdot$cm) or higher. Further, the transmittance of the upper alignment layer URI is 90% (/100 nm) or higher, whereas the transmittance of the lower alignment layer DRI is 98% (/100 nm) or higher.

The alignment layer ORI1 is formed in such a manner that, for example, the lower alignment layer DRI is formed by coating a resin film with a high transmittance and a high resistance (resistivity), the upper alignment layer URI is thereafter formed by coating a resin film lower in transmittance and resistance (resistivity) than the insulating film DRI, and then the surface of the upper alignment layer URI is rubbed. In this case, the resin film with a high resistance (resistivity) can be formed by coating resin composed of, for example, soluble polyimide or polyamic acid, and the resin film with a low resistance (resistivity) can be formed by coating and burning resin composed of, for example, polyamic acid. It should be noted that the resin with a low resistance (resistivity) will be described later in detail.

It should be noted that the first substrate SUB1 configured in such a manner and the second substrate SUB2 are arranged to face each other through the liquid crystal LC, and an alignment layer ORI2 is formed on the face of the second substrate SUB2 on the liquid crystal LC-side so as to be brought into contact with the liquid crystal LC. The resistance (resistivity) of the alignment layer ORI2 is, for example, $10^{14}$ ($\Omega \cdot$cm) or lower, and is substantially the same as that of the upper alignment layer URI of the alignment layer ORI1. Black matrixes, color filters and the like are generally formed on the face of the second substrate SUB2 shown in FIG. 1 on the liquid crystal LC-side, but are not illustrated.

Figure 4:
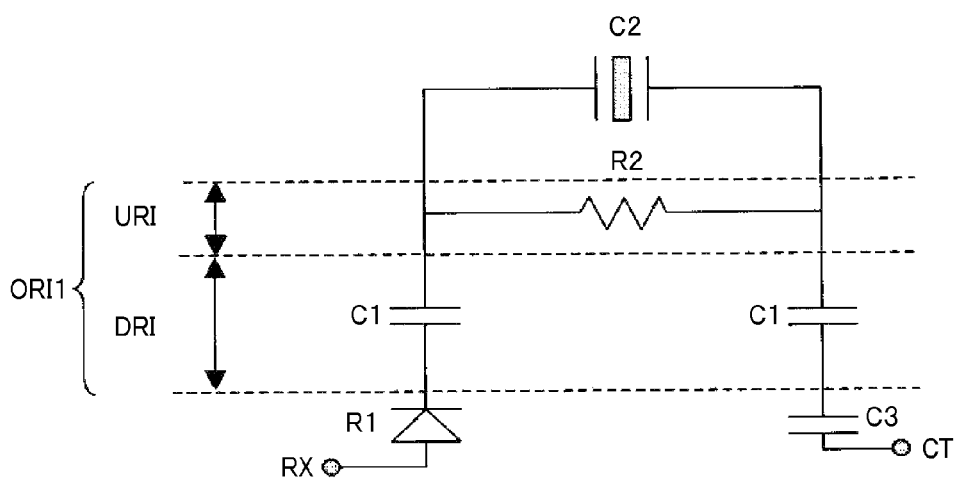
FIG. 4 shows an equivalent circuit of an alignment layer ORI1 along the line EF of electric force of an electric field ranging from a pixel electrode PX to an opposite electrode CT in the liquid crystal display device according to the first embodiment of the present invention.

FIG. 4 shows an equivalent circuit of the alignment layer ORI1 along the line EF of electric force of an electric field ranging from the pixel electrode PX to the opposite electrode CT in the liquid crystal display device according to the first embodiment of the present invention. It should be noted that the alignment layer ORI1 composed of the lower alignment layer DRI and the upper alignment layer URI is shown by dotted lines in FIG. 4.

Figure 9:
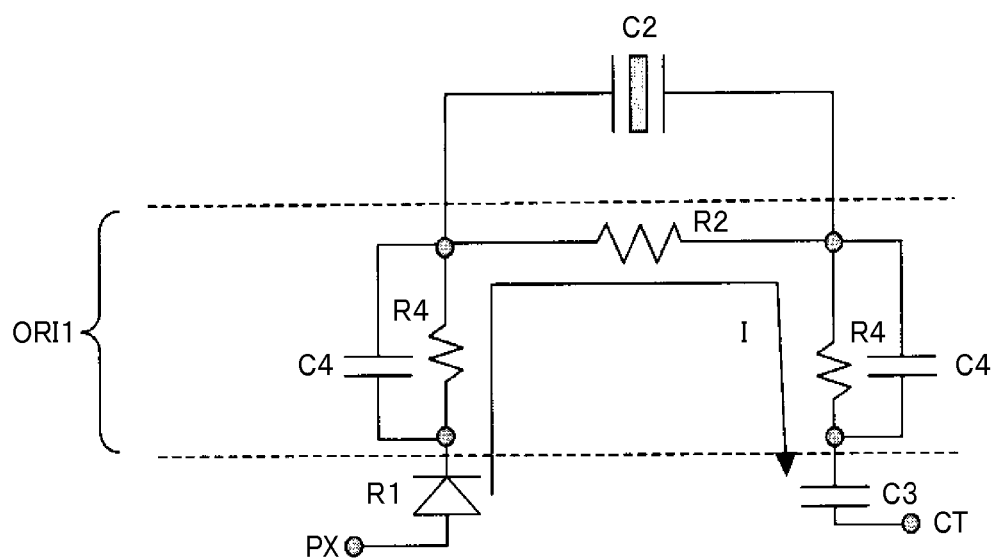
FIG. 9 shows an equivalent circuit of an alignment layer ORI1 along the line EF of electric force of an electric field ranging from a pixel electrode PX to an opposite electrode CT in the conventional liquid crystal display device.

As shown in FIG. 4, the equivalent circuit can be recognized as a circuit in which an interfacial resistance R1 between the pixel electrode PX and the lower alignment layer DRI, a capacitance C1 of the lower alignment layer DRI, a parallel-connection part of a resistance R2 of the upper alignment layer URI and a capacitance C2 of the liquid crystal, a capacitance C1 of the lower alignment layer DRI, and a capacitance C3 of the insulating film IN are connected in series. In this case, the lower alignment layer DRI is high in resistance (resistivity) as described above, and thus it can be assumed that the resistance R4 shown in FIG. 9 is not provided in this area. Thus, DC current shown in FIG. 9 is not generated. Therefore, no residual DC is accumulated in the insulating film IN, and so-called baking or flicker can be prevented from occurring. Further, even if DC current is generated in the insulating film IN, the residual DC generated in the insulating film IN passes through the upper alignment layer URI with a low resistance (resistivity), and the baking can be easily eliminated (recovered).

Figure 5:
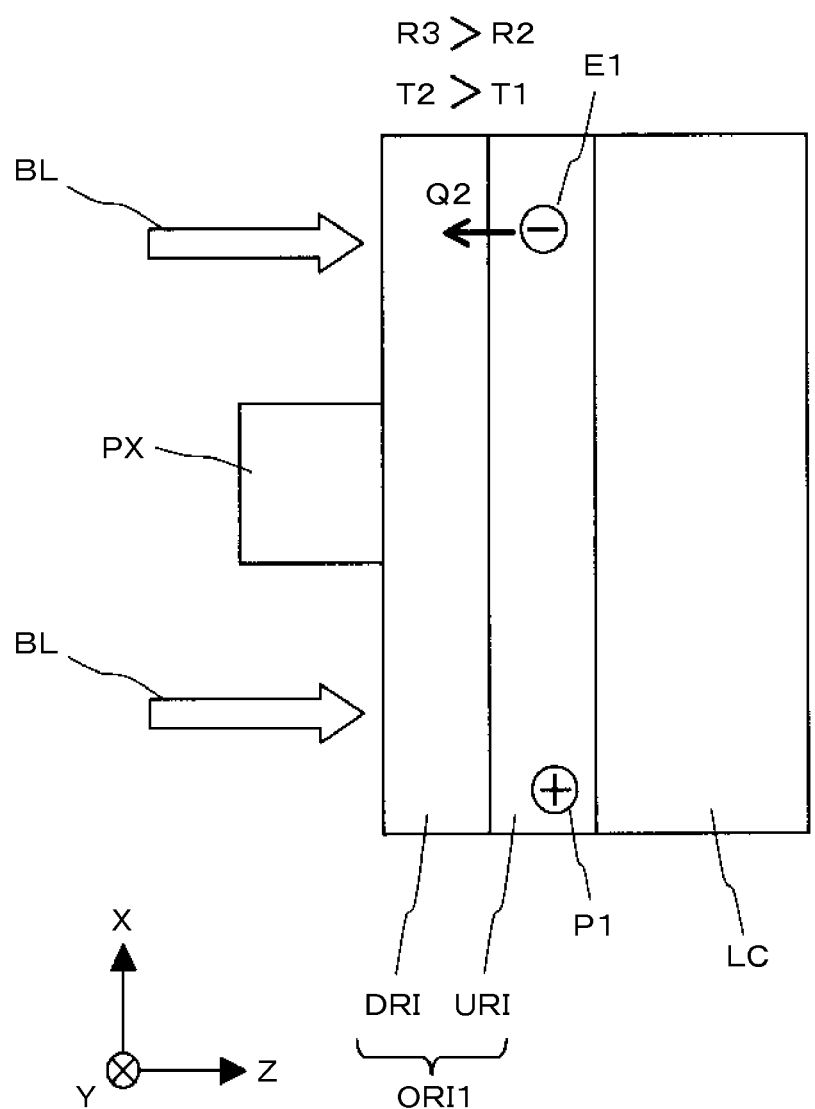
FIG. 5 is an enlarged view of a pixel electrode portion in the liquid crystal display device according to the first embodiment of the present invention.
Figure 8:
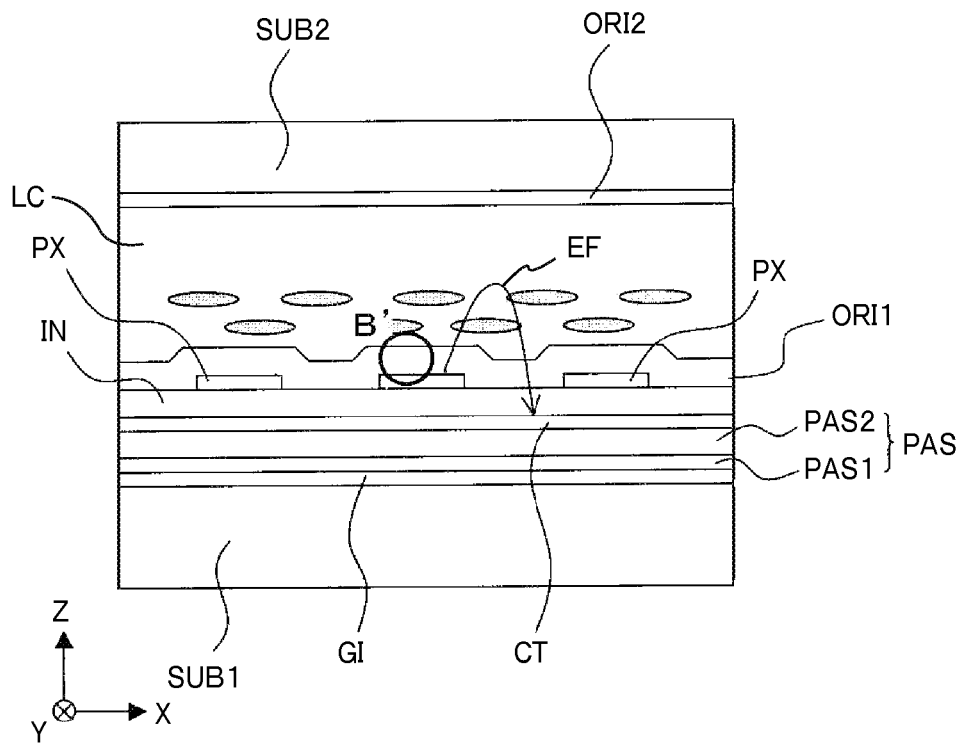
FIG. 8 is a cross-sectional view for showing an example of a pixel in a conventional liquid crystal display device.
Figure 10:
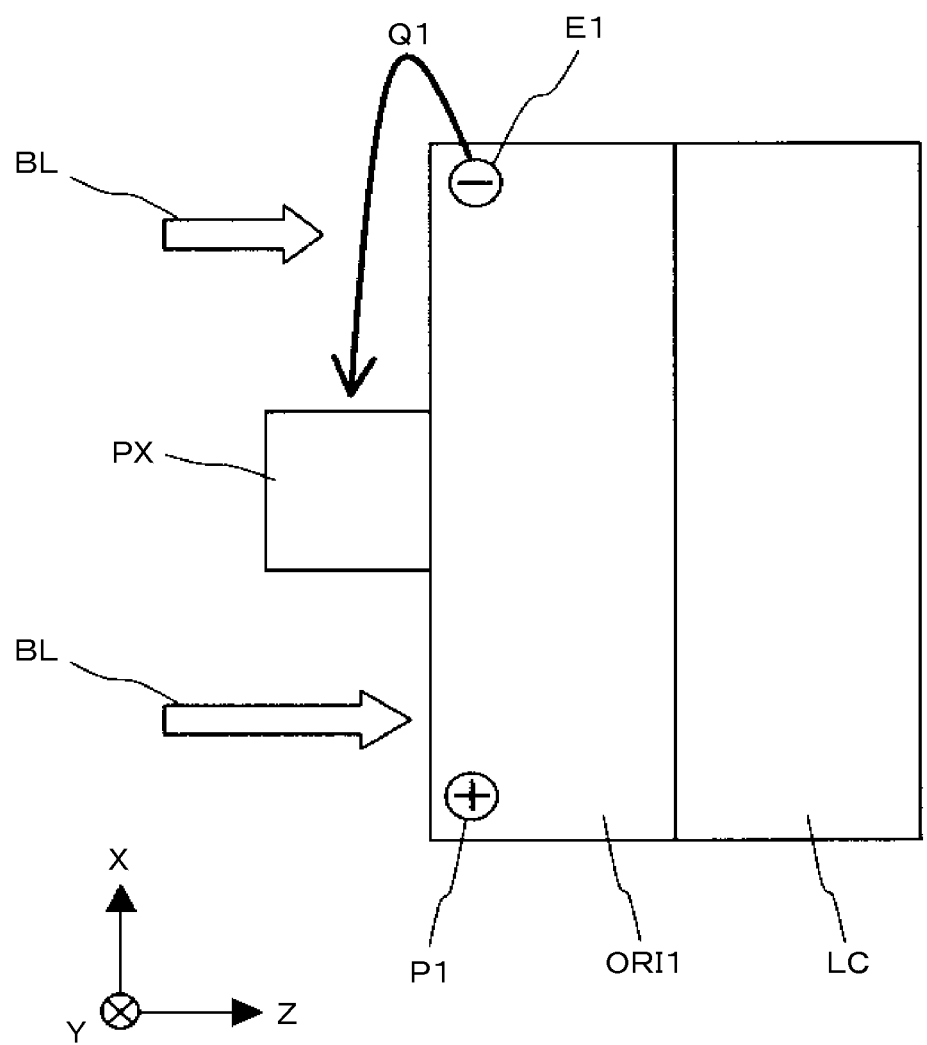
FIG. 10 is an enlarged view of a pixel electrode portion in the conventional liquid crystal display device.

Next, FIG. 5 shows an enlarged view of a pixel electrode portion in the liquid crystal display device of the first embodiment, and FIG. 10 shows an enlarged view of a pixel electrode portion in a conventional liquid crystal display device. Hereinafter, current (photoconductor current) generated in the alignment layer ORI1 of the liquid crystal display device of the first embodiment will be described in detail on the basis of FIG. 5 and FIG. 10. It should be noted that FIG. 5 shows an enlarged view of a circle B shown in FIG. 3, and FIG. 10 shows an enlarged view of a circle B' shown in FIG. 8. Further, thin films other than the liquid crystal layer LC, the alignment layer ORI1, and the pixel electrode PX are not illustrated in FIG. 5 and FIG. 10.

In the configuration of the alignment layer ORI1 of the conventional liquid crystal display device shown in FIG. 10, the alignment layer ORI1 is formed using one layer, and the pixel electrode PX (it should be noted that if the configuration of the pixel is different, the opposite electrode CT may be formed) is formed under (on the left side in the drawing) the alignment layer ORI1. In this case, the alignment layer ORI1 is directly laminated on the upper face (the face on the liquid crystal layer LC-side) of the pixel electrode PX so as to cover the upper face of the pixel electrode PX. Therefore, backlight BL shown by white arrows in FIG. 10 penetrates the alignment layer ORI1, and then is irradiated onto the liquid crystal layer LC. At the time of the penetration, part of the irradiation of the backlight BL is absorbed by the alignment layer ORI1, and electrical charge in the alignment layer ORI1 is polarized into positive electrical charge P1 and negative electrical charge E1. In this case, voltage applied to the pixel electrode PX and the opposite electrode CT is periodically changed in the liquid crystal display device. Accordingly, only one of the positive electrical charge P1 and the negative electrical charge E1 generated in the alignment layer ORI1 is moved to the pixel electrode PX as shown by an arrow Q1 in FIG. 10. In this case, other electrical charge is moved in the alignment layer ORI1 to generate photoconductor current.

Using a common signal applied to the opposite electrode CT as a reference, tone signals (video signals) are alternately supplied to the pixel electrode PX, so that potential differences when positive voltage is applied and when negative voltage is applied become the same in the case of the same tone. In this case, at the timing when voltage higher than that for the opposite electrode CT is supplied to the pixel electrode PX (when positive voltage is applied), the negative electrical charge E1 corresponding to the voltage applied to the pixel electrode PX is moved from the alignment layer ORI1 to the pixel electrode PX as shown by the arrow Q1 in FIG. 10. Likewise, at the timing when voltage lower than that for the opposite electrode CT is supplied to the pixel electrode PX (when negative voltage is applied), the positive electrical charge P1 generated in the alignment layer ORI1 is moved to the pixel electrode PX.

In this case, the amount of positive electrical charge P1 and negative electrical charge E1 generated in the alignment layer ORI11 moved to the pixel electrode PX as well as the amount of electrical charge moved in the alignment layer ORI1 are not constant. Therefore, potential differences between the pixel electrode PX and the opposite electrode CT when positive voltage is applied and when negative voltage is applied vary in the case of the same tone, and the flicker occurs.

On the contrary, the alignment layer ORI1 is, as shown in FIG. 5, formed using the two thin films of the lower alignment layer DRI and the upper alignment layer URI in the liquid crystal display device of the first embodiment.

As described above, the alignment layer ORI1 of the first embodiment is configured using the lower alignment layer DRI formed on the upper face side (the liquid crystal layer LC-side) of the electrode and the upper alignment layer URI formed on the upper face side of the lower alignment layer DRI. It should be noted that the alignment layer ORI1 is, as described above, formed so as to cover at least the whole display area AR as similar to the conventional alignment layer. Thus, each of the upper alignment layer URI and the lower alignment layer DRI is formed to cover the whole display area AR.

In addition, the transmittance of the lower alignment layer DRI is higher than that of the upper alignment layer URI in the alignment layer ORI1 of the first embodiment. Specifically, in the case where the thickness of the upper alignment layer URI is substantially the same as that of the lower alignment layer DRI, the transmittance of the thin-film material to form the lower alignment layer DRI is higher than that to form the upper alignment layer URI. Accordingly, in the case where the transmittance of the upper alignment layer URI is T1 and that of the lower alignment layer DRI is T2, T1<T2 is satisfied. It should be noted that the thickness of the upper alignment layer URI may be different from that of the lower alignment layer DRI in a range where T1<T2 is satisfied, and the thicknesses may be appropriately changed.

As described above, the transmittance T2 of the lower alignment layer DRI is higher than the transmittance T1 of the upper alignment layer URI in the alignment layer ORI1 of the first embodiment. Thus, the generation of the electrical charge (the positive electrical charge P1 and negative electrical charge E1) in the lower alignment layer DRI that is formed in contact with the pixel electrode PX can be considerably reduced. Accordingly, the generation of the photoconductor current due to the movement of the generated electrical charge to the pixel electrode PX can be considerably reduced.

Hereinafter, the effect of reducing the photoconductor current due to the movement of the electrical charge generated in the upper alignment layer URI to the pixel electrode PX will be described.

In the alignment layer ORI1 of the first embodiment, the thin-film material with a resistance value (resistivity) per unit length larger than that for the upper alignment layer URI is used for the lower alignment layer DRI as described above. Thus, the resistance value of the lower alignment layer DRI becomes larger than that of the upper alignment layer URI. In this case, since the thickness of the upper alignment layer URI is substantially the same as that of the lower alignment layer DRI as apparent from FIG. 5, the resistance values of the upper alignment layer URI and the lower alignment layer DRI are proportional to the resistivities of the thin-film materials used to form the upper alignment layer URI and the lower alignment layer DRI. Accordingly, in the case where the resistance of the upper alignment layer URI is R2 and the resistance of the lower alignment layer DRI is R3, R2<R3 is satisfied. It should be noted that if the resistivity of the lower alignment layer DRI is higher than that of the upper alignment layer URI, the thickness of the upper alignment layer URI may be different from that of the lower alignment layer DRI, and the thicknesses can be appropriately changed. For example, even if an organic material with a higher resistance value (sheet resistance) per unit volume is used as the lower alignment layer DRI to make the thickness smaller than that of the upper alignment layer URI, the resistivity of the lower alignment layer DRI can be increased.

In this case, the transmittance T2 of the lower alignment layer DRI is higher than the transmittance T1 of the upper alignment layer URI. Accordingly, polarization of electrical charge (generation of the positive electrical charge P1 and the negative electrical charge E1) in the thin film is more likely to occur in the upper alignment layer URI than in the lower alignment layer DRI due to irradiation of the backlight BL. Specifically, as shown in FIG. 5, the electrical charge is more polarized into the positive electrical charge P1 and the negative electrical charge E1 in the upper alignment layer URI that is a thin film layer in contact with the liquid crystal layer LC than in the lower alignment layer DRI that is a thin film layer in contact with the pixel electrode PX.

In the case of the timing when the electric potential of the pixel electrode PX is higher than that of the opposite electrode CT, an electric field from the pixel electrode PX is formed to reach the opposite electrode CT (not shown) through the lower alignment layer DRI, the upper alignment layer URI, and the liquid crystal layer LC. Thus, in the alignment layer ORI1 formed on the surface of the pixel electrode PX on the liquid crystal layer LC-side, the negative electrical charge E1 generated in the upper alignment layer URI is moved from the upper alignment layer URI to the lower alignment layer DRI as shown by an arrow Q2 in FIG. 5. In this case, the resistance R3 of the lower alignment layer DRI is higher than the resistance R2 of the upper alignment layer URI in the alignment layer ORI1 of the first embodiment. Accordingly, even when the negative electrical charge E1 is moved to the lower alignment layer DRI, the negative electrical charge E1 can be considerably reduced. Thus, the negative electrical charge E1 reaching the pixel electrode PX through the lower alignment layer DRI can be suppressed considerably. On the other hand, in the case of the timing when the electric potential of the opposite electrode CT is higher than that of the pixel electrode PX, the positive electrical charge P1 generated in the upper alignment layer URI is moved to the lower alignment layer DRI. However, the positive electrical charge P1 reaching the pixel electrode PX through the lower alignment layer DRI can be suppressed considerably as similar to the case of the negative electrical charge E1.

In the alignment layer ORI1 with such a configuration, a well-known translucent inorganic insulating film or organic insulating film is used for the lower alignment layer DRI. Further, on the assumption that first, second, and third compounds that are generally used as organic materials to form the alignment layer are represented as M1, M2, and N1, respectively, a compound represented by the following characteristic general expression (1) is used for the upper alignment layer URI in the first embodiment of the present invention. It should be noted that x and y satisfy x+y=1.

  (1)

Especially, in the liquid crystal display device of the first embodiment, the first and second compounds M1 and M2 shown in the general expression (1) are composed of compounds represented by the following general expressions (2) and (3), respectively. In addition, the compound N1 is a hydrocarbon organic material, for example, the diamine compound represented by the following general expression (4). It should be noted that R in the general expression (4) is selected from compounds of benzene and linear alkyl, benzene and hetero bond, and alkyl and hetero bond such as Ph-$(CH_2)_n$-Ph, Ph-O-Ph, Ph-O—$(CH_2)_n$—O-Ph.

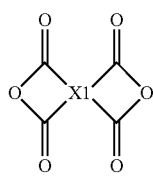  (2)

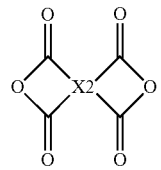  (3)

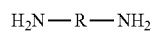  (4)

$H_2N$—R—$NH_2$

In this case, in the case of PMDA (pyromellitic acid dianhydride) that is a compound represented by the general expression (5) suitable as a compound represented by the general expression (2), (M1-N1)x of the general expression (1) forming the upper alignment layer UR1 of the first embodiment is a compound represented by the following general expression (7). Likewise, in the case of CBDA (1,2,3,4-cyclobutanetetracarboxylic dianhydride) that is a compound represented by the general expression (6) suitable as a compound represented by the general expression (3), (M2-N1)y of the general expression (1) is a compound represented by the following general expression (8). Accordingly, the upper alignment layer URI of the first embodiment is formed using a compound represented by the following general expression (9) having a copolymer structure of the general expression (7) and the general expression (8). It should be noted that two kinds of acid anhydride that are compounds represented by the general expressions (2) and (3) are not limited to PMDA and CBDA represented by the general expressions (5) and (6), respectively. Other compounds satisfying the conditions of the resistivity and transmittance (to be described later) may be used.

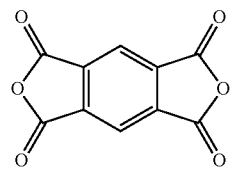  (5)

PMDA (Pyromellitic Acid Dianhydride)

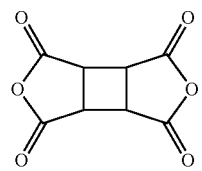  (6)

CBDA (1,2,3,4-cyclobutanetetracarboxylic dianhydride)

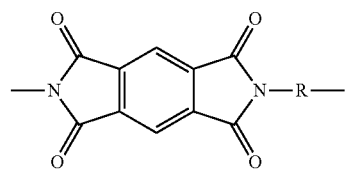  (7)

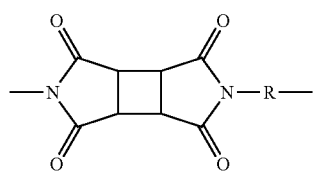
(8)

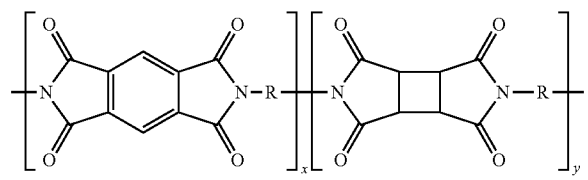
(9)

Figure 6:
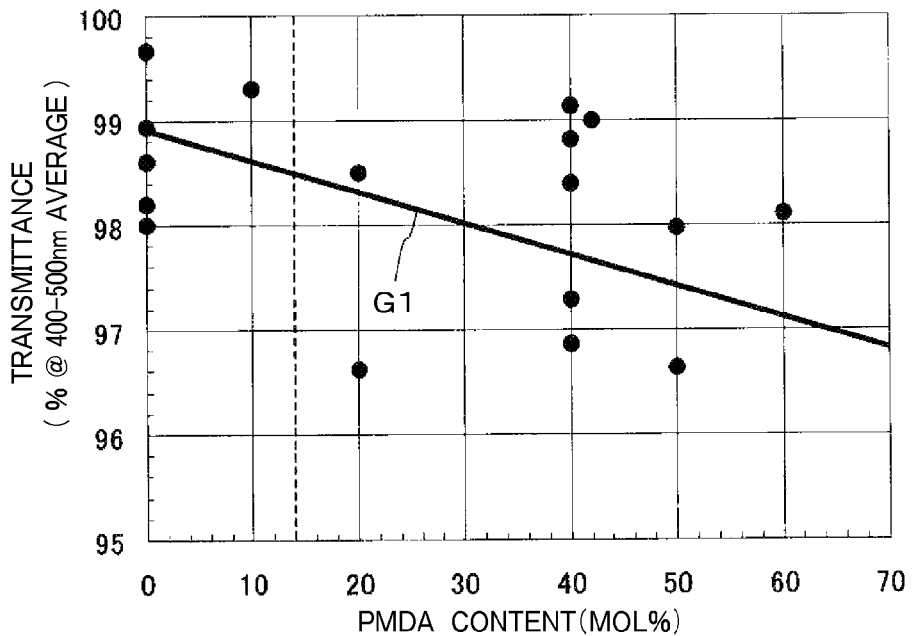
FIG. 6 is a diagram for showing measurement values of the transmittance (%) of a thin film for 400 nm to 500 nm light relative to the mass molar concentration (mol %) of PMDA of an upper alignment layer according to the first embodiment of the present invention.

In the case where PMDA (general expression (5)) and CBDA (general expression (6)) are used as acid anhydride of a compound represented by the general expression (9), as the mass molar concentration of PMDA is increased, the transmittance is decreased as apparent from a graph G1 of measurement values of the transmittance (%) of a thin film for 400 nm to 500 nm light relative to the mass molar concentration (mol %) of PMDA of the amount of acid anhydride shown in FIG. 6. Accordingly, as the mass molar concentration of PMDA is increased, the transmittance T1 of the upper alignment layer URI forming the alignment layer ORI1 of the first embodiment formed using the compound represented by the general expression (9) is decreased. The entire efficiency of the alignment layer ORI1 of the first embodiment is decreased.

Figure 7:
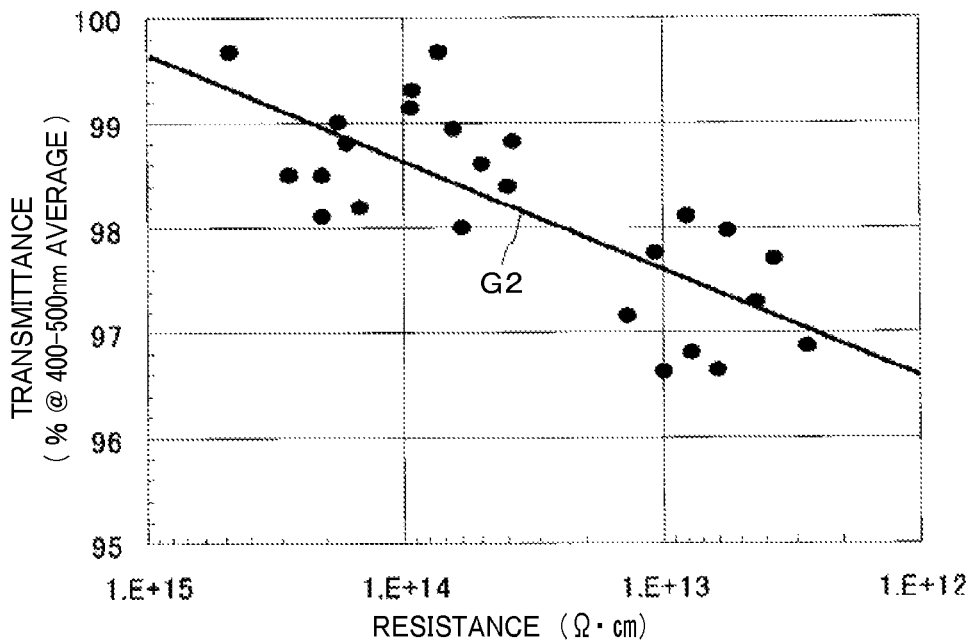
FIG. 7 is a diagram for showing measurement values of the transmittance (%) of a thin film for 400 nm to 500 nm light relative to the resistance value (resistivity) per unit length of the upper alignment layer according to the first embodiment of the present invention.

On the other hand, in the case where the mass molar concentration of PMDA to be contained is increased in the compound represented by the general expression (9), the resistance (resistivity) of the upper alignment layer URI is decreased. Accordingly, in the case where the mass molar concentration of PMDA contained in the alignment layer is increased and the resistance (resistivity) of the alignment layer is decreased, the transmittance is decreased as apparent from a graph G2 of measurement values of the transmittance (%) of a thin film for 400 nm to 500 nm light relative to the resistance value (resistivity) per unit length shown in FIG. 7.

Accordingly, in the alignment layer ORI1 of the first embodiment in which the upper alignment layer URI is formed using the compound represented by the general expression (9), the PMDA content, namely, the mass molar concentration is increased so as to be able to form the alignment layer in which the transmittance T1 of the upper alignment layer URI is lower than the transmittance T2 of the lower alignment layer DRI and the resistance R2 of the upper alignment layer URI is lower than the resistance R3 of the lower alignment layer DRI. Especially, in an area where the mass molar concentration of PMDA is 14% or higher as shown by a dotted line in FIG. 6, the transmittance can be 98.6% or lower and the resistance (resistivity) can be $10^{14}$ ($\Omega \cdot cm$) or lower. Thus, it is suitable for the alignment layer DRI.

As described above, in the alignment layer ORI1 of the first embodiment, the transmittance T2 of the lower alignment layer DRI that is directly brought into contact with the pixel electrode PX is higher than the transmittance T1 of the upper alignment layer URI that is formed apart from the pixel electrode PX, and the resistance value R3 of the lower alignment layer DRI is higher than the resistance value R2 of the upper alignment layer URI. Accordingly, the generation of electrical charge near the pixel electrode PX can be reduced considerably, and the electrical charge (the positive electrical charge P1 and the negative electrical charge E1) generated in the upper alignment layer URI that is directly brought into contact with the liquid crystal layer LC can be prevented considerably from moving (flowing) through the lower alignment layer DRI to the pixel electrode that is formed in contact with or near the lower alignment layer DRI. Specifically, even when the backlight BL enters to generate the electrical charge (the positive electrical charge P1 and the negative electrical charge E1) in the upper alignment layer URI, the electrical charge can be prevented from moving toward the pixel electrode PX through the lower alignment layer DRI to change the electric potential of the pixel electrode PX. Accordingly, potential differences between the pixel electrode PX and the opposite electrode CT when positive voltage is applied and when negative voltage is applied for the same tone can be prevented from being changed. Thus, the flicker can be prevented from being generated and the display performance can be improved.

It should be noted that there has been described a case in which only the upper alignment layer URI forming the alignment layer ORI1 is formed using the compound represented by the general expression (9) in the liquid crystal display device of the above-described first embodiment. However, the present invention is not limited to this, but, for example, only the compound represented by the general expression (9) can be used. Specifically, as apparent from FIG. 6 and FIG. 7, for example, the lower alignment layer DRI can be formed using a material whose PMDA content in the compound represented by the general expression (9), namely, the mass molar concentration of PMDA is 14% or lower, and the upper alignment layer URI can be formed using a material whose mass molar concentration of PMDA is 14% or higher.

In this case, in an area where the mass molar concentration of PMDA is 14% or lower, the transmittance of the compound represented by the general expression (9) is 98.6% or higher, and the resistance (resistivity) thereof is $10^{14}$ ($\Omega \cdot cm$) or higher. On the other hand, in an area where the mass molar concentration of PMDA is 14% or higher, the transmittance of the compound represented by the general expression (9) is 98.6% or lower, and the resistance (resistivity) thereof is $10^{14}$ ($\Omega \cdot cm$) or lower. Further, as apparent from the graph G1 shown in FIG. 6, the transmittance of the compound represented by the general expression (9) is 96.8% or higher in an area where the mass molar concentration of PMDA is higher than 0% and 70% or lower. Thus, when the upper alignment layer URI and the lower alignment layer DRI are formed using the compound represented by the general expression (9), the mass molar concentration of PMDA can be selected in a wide range, and the present invention can be advantageously adapted to various coating methods.

In the formation of the alignment layer ORI1 with such a configuration, when the upper alignment layer URI is formed after the lower alignment layer DRI is formed, the lower alignment layer DRI and the upper alignment layer URI are sequentially formed using the compounds represented by the general expression (9) in which only the mass molar concentrations of PMDA are different. Accordingly, even when the alignment layer ORI1 is formed using two thin films of the lower alignment layer DRI and the upper alignment layer URI, only the mass molar concentration of PMDA in the compound represented by the general expression (9) coated on the surface of the first substrate SUB1 on the liquid crystal side is different, and the other conditions may be the same. As a result, the time required to switch the conditions in each manufacturing process when forming the alignment layer ORI1 using two thin films of the lower alignment layer DRI and the upper alignment layer URI can be shortened, and the manufacturing time can be advantageously prevented from being increased.

The invention achieved by the inventors has been concretely described above on the basis of the embodiment of the present invention. However, the present invention is not limited to the embodiment, but can be variously changed without departing from the gist of the present invention.

Further, the present invention is not limited to the above-described embodiment, but includes various modifications. For example, the embodiment has been described in detail to understandably explain the present invention, and is not necessarily limited to one having the all constitutional elements described above. Further, a part of the configuration in one embodiment can be replaced by a configuration of another embodiment, and the configuration in one embodiment can be added to another embodiment. In addition, a part of the configuration in the embodiment can be added to or replaced by another, or deleted.

Although the reference numerals have been described in the embodiment using the drawings, the main reference numerals will be described below again.

SUB1 . . . first substrate, SUB2 . . . second substrate, SL . . . seal member, AR . . . display area, SEC . . . semiconductor device (chip), GL . . . gate signal line, DL . . . drain signal line, CL . . . common signal line, TFT . . . thin-film transistor, PX . . . pixel electrode CT . . . opposite electrode, GI . . . insulating film, PAS . . . protective film, PAS1 . . . inorganic insulating film PAS2 . . . organic insulating film, IN . . . insulating film, ORI1, ORI2 . . . alignment layer, URI . . . upper alignment layer, DRI . . . lower alignment layer, LC . . . liquid crystal (liquid crystal layer), EF . . . line of electric force, BL . . . backlight

What is claimed is:

1. A liquid crystal display device comprising a first substrate and a second substrate that are arranged to face each other while sandwiching liquid crystal,
wherein a first electrode and a plurality of second electrodes overlapped with the first electrode through an insulating film are formed at a pixel area on the liquid crystal side of the first substrate, one of the first electrode and the second electrodes is used as a pixel electrode, and the other is used as an opposite electrode;
an alignment layer which is a two-layer structure is provided which includes a first alignment layer comprising a first polyimide and/or polyamic acid formed on the liquid crystal side of the first substrate to cover the second electrodes and the whole display area, and a second alignment layer comprising a second polyimide and/or polyamic acid formed on the liquid crystal side of the first alignment layer to cover the first alignment layer and the whole display area;
the resistance of the second alignment layer is lower than that of the first alignment layer, and the transmittance of the second alignment layer is lower than that of the first alignment layer for the wavelength span of 400 nm to 500 nm of light; and
at least the second alignment layer is configured using a polyimide and/or polyamic acid compound obtained by polymerizing PMDA (pyromellitic acid dianhydride) serving as a first compound with a hydrocarbon organic material,
wherein the mass molar concentration of polymerized PMDA is higher in the second alignment layer than in the first alignment layer.

2. The liquid crystal display device according to claim 1, wherein the mass molar concentration of polymerized PMDA is 14% or higher in the second alignment layer.

3. The liquid crystal display device according to claim 1, wherein the hydrocarbon organic material forming the second alignment layer is a diamine compound represented by the following general expression (10)

$$H_2N-R-NH_2 \tag{10}$$

wherein R is selected from benzene and linear alkyl bond (Ph-$(CH_2)_n$-Ph), benzene hetero bond (Ph-O-Ph), or benzene alkyl hetero bond (Ph-O-$(CH_2)_n$-O-Ph).

4. The liquid crystal display device according to claim 3, wherein the second alignment layer is a compound having a structure represented by the following general expression (13) composed of compounds shown by copolymerization of the following general expressions (11) and (12)

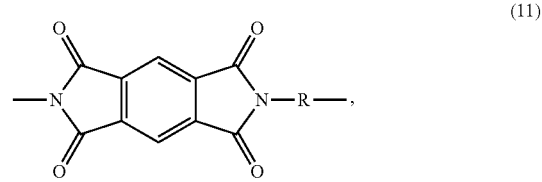

(11)

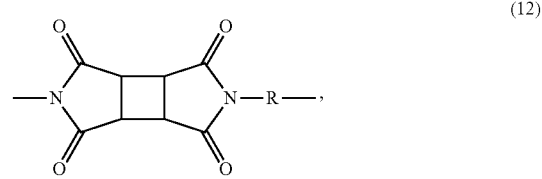

(12)

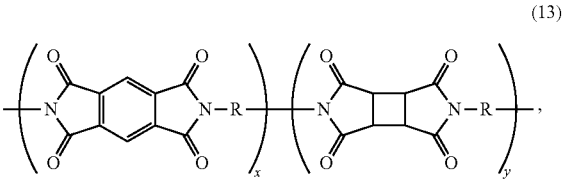

(13)

wherein x and y are 1 or more in general expression (13).

5. The liquid crystal display device according to claim 4, wherein the first alignment layer is configured using a compound having a structure represented by the general expression (13) as similar to the second alignment layer, and
the mass molar concentration of PMDA (pyromellitic acid dianhydride) forming the first alignment layer is 14% or lower.

* * * * *